US007925271B2

(12) United States Patent
Ranta-Aho et al.

(10) Patent No.: US 7,925,271 B2
(45) Date of Patent: Apr. 12, 2011

(54) APPARATUS AND METHOD FOR ARBITRARY DATA RATE RAMP UP AFTER OVERLOAD ON WIRELESS INTERFACE

(75) Inventors: Karri Ranta-Aho, Espoo (FI); Antti Toskala, Espoo (FI)

(73) Assignee: Spyder Navigations L.L.C., Wilmington, DE (US)

( * ) Notice: Subject to any disclaimer, the term of this patent is extended or adjusted under 35 U.S.C. 154(b) by 1341 days.

(21) Appl. No.: 11/270,047

(22) Filed: Nov. 8, 2005

(65) Prior Publication Data

US 2006/0105774 A1     May 18, 2006

Related U.S. Application Data

(60) Provisional application No. 60/626,598, filed on Nov. 9, 2004.

(51) Int. Cl.
*H04W 72/00* (2009.01)
*H04B 1/38* (2006.01)

(52) U.S. Cl. ........................................ 455/453; 455/560

(58) Field of Classification Search ................... 455/453, 455/560; 370/328, 329, 236, 229
See application file for complete search history.

(56) References Cited

U.S. PATENT DOCUMENTS

| 6,463,286 | B1 * | 10/2002 | Salminen ........................ 455/453 |
| 6,768,905 | B2 * | 7/2004 | Goodjohn et al. ............. 455/423 |
| 7,724,656 | B2 * | 5/2010 | Sågfors et al. ................. 370/229 |
| 2004/0085935 | A1 | 5/2004 | Robinson et al. |
| 2006/0128394 | A1 * | 6/2006 | Turina et al. ................... 455/453 |
| 2008/0096576 | A1 * | 4/2008 | Brueck et al. .................. 455/453 |
| 2008/0137536 | A1 * | 6/2008 | Hede .............................. 370/236 |
| 2008/0279139 | A1 * | 11/2008 | Beziot et al. ................... 370/329 |

* cited by examiner

*Primary Examiner* — Lester Kincaid
*Assistant Examiner* — Nathan Mitchell

(57) ABSTRACT

To prevent oscillation in load levels on radio interfaces between one or more user equipment devices and neighboring base stations after the base stations have reduced the data rates of the one or more user equipment devices connected thereto over said radio interfaces, one or more radio network controllers select appropriate delay periods for each neighboring base station so that each base station waits for a different recovery period after a maximum or target load level has been exceeded before increasing loading.

10 Claims, 4 Drawing Sheets

APPARATUS AND METHOD FOR ARBITRARY DATA RATE RAMP UP AFTER OVERLOAD ON WIRELESS INTERFACE

CROSS-REFERENCE TO RELATED APPLICATION

This application claims priority from U.S. Provisional Application Ser. No. 60/626,598 filed Nov. 9, 2004.

BACKGROUND OF THE INVENTION

1. Technical Field

The field of the invention is mobile communications and, more particularly, to enhancing the control of radio interference existing between one or more mobile devices and one or more nearby base stations.

2. Discussion of Related Art

The invention relates to the 3GPP (Third Generation Partnership Project) specification of the Universal Mobile Telecommunications System (UMTS) Terrestrial Radio Access (UTRA) and more specifically to the Wideband Code Division Multiple Access (WCDMA) High Speed Uplink Packet Access (HSUPA) which is an enhanced uplink feature used in the Frequency Division Duplex (FDD) mode. This feature is being specified in the 3GPP and targeted to 3GPP release 6. A similar enhancement is being done in a high speed downlink packet access (HSDPA).

Referring to FIG. 1, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over a (wired) Iu interface.

FIG. 2 shows some further details of the architecture, particularly the UTRAN. The UTRAN includes multiple Radio Network Subsystems (RNSs), each of which contains at least one Radio Network Controller (RNC). Each RNC may be connected to multiple Node Bs which are 3GPP counterparts to GSM base stations. Each Node B may be in radio contact with multiple UEs via the radio interface (Uu) shown in FIG. 1. A given UE may be in radio contact with multiple Node Bs even if one or more of the Node Bs are connected to different RNCs. For instance a UE1 in FIG. 2 may be in radio contact with Node B 2 of RNS 1 and Node B 3 of RNS 2 where Node B 2 and Node B 3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. One of the RNCs will act as the "serving" or "controlling" RNC (SRNC or CRNC) while the other will act as a "drift" RNC (DRNC). A chain of such RNCs can be established to extend from a given SRNC ending with a DRNC. The multiple Node Bs will typically be neighboring Node Bs in the sense that each will be in control of neighboring cells. The mobile UEs are able to traverse the neighboring cells without having to re-establish a connection with a new Node B because either the Node Bs are connected to a same RNC or, if they are connected to different RNCs, the RNCs are connected to each other.

One part of the HSUPA feature is a fast Node B controlled scheduling, which enables much more aggressive scheduling due to the possibility to quickly react to overload situations. HSUPA and the fast Node B controlled scheduling are also supported in soft handover. A similar feature may be deployed for the HSDPA and it should be realized that although the description below is mostly confined to the HSUPA, the same principles can be applied to the HSDPA.

The HSUPA scheduling is de-centralized, i.e. each Node B schedules without knowing what the other Node Bs are doing. Still, decisions done in one cell affect to the neighboring cells because of the phenomenon called "other cell interference." Furthermore, in soft handover, only one Node B may be delivering scheduling commands leading to increased transmission data rate (seen as higher transmission power) to the UE that is actually in connection to multiple Node Bs.

Thus it is quite likely that one scheduling decision may result with an overload or near-overload situation in multiple cells simultaneously. This as such is not a problem as the schedulers in each Node B will independently reduce the data rates of the UEs they can control and thus recover from this situation.

It should however be kept in mind that there is a certain latency from the Node B making a scheduling decision and transmitting the scheduling command before the effect is seen in the uplink interference levels. Because of this the following fluctuation effect may be experienced:

1. The overload situation is detected simultaneously in multiple neighboring cells due to a single interfering UE or multiple interfering UEs that contribute to the uplink interference of multiple cells.
2. Two or more schedulers in neighboring Node Bs will act on the high uplink interference situation by commanding the UEs to lower their data rate (in effect to reduce their transmission powers).
3. The overload condition is cleared for all the schedulers, and they start independently to fill in the freed capacity by admitting higher data rates (i.e. higher transmission powers) for the users they are scheduling.

This may lead to oscillating uplink interference as there is some delay from the scheduling decision before the actual interference situation is changed and thus multiple schedulers will easily grant higher data rates almost simultaneously and then again reduce the data rates rapidly due to overload situation that occurred due to multiple UEs increasing their transmission powers.

DISCLOSURE OF INVENTION

According to a first aspect of the present invention, a method comprises determining different delay periods for each of a plurality of neighboring base stations, and transmitting the determined delay periods to each of the neighboring base stations for use in delaying a recovery period before increasing loading after a maximum or target load level was exceeded in a radio interface between one or more of the neighboring base stations and one or more user equipment devices connected thereto by said radio interface. This first aspect of the invention could be carried out for instance in a radio network controller.

According to a second aspect of the invention, a method comprises receiving in a base station a maximum or target load level and a recovery period parameter from a radio network controller, determining if the maximum or target load level has been exceeded on a radio interface between the base station and one or more user equipment devices connected thereto by said radio interface, reducing data rates of selected user equipment devices, determining whether a normal load condition has been achieved subsequent to said reducing the data rates of selected user equipment devices, and waiting for a recovery period indicated by said recovery period parameter before increasing loading and again determining if the maximum or target load level is exceeded. This second aspect of the invention could for instance be carried out in a Node B.

According to a third aspect of the present invention, apparatus comprises a device for determining different delay periods for each of a plurality of neighboring base stations; and a device for transmitting the determined delay periods to each of the neighboring base stations for use in delaying a recovery period before increasing loading after a maximum or target load level was exceeded in a radio interface between one or more of the neighboring base stations and one or more user equipment devices connected thereto by said radio interface. This aspect of the invention could for instance be embodied in a radio network controller.

According to a fourth aspect of the present invention, apparatus comprises a device for receiving in a base station a maximum or target load level and a recovery period parameter from a radio network controller, a device for determining if the maximum or target load level has been exceeded on a radio interface between the base station and one or more user equipment devices connected thereto by said radio interface, a device for reducing data rates of selected user equipment devices, a device for determining whether a normal load condition has been achieved subsequent to reducing the data rates of selected user equipment devices, a device for waiting for a recovery period indicated by said recovery period parameter before increasing loading and again determining if the maximum or target load level is exceeded. This aspect of the present invention could for instance be embodied in a Node B.

According to a fifth aspect of the present invention, a mobile device comprises a device for receiving signaling from a base station commanding a reduction of a data rate on a radio interface between the mobile device and the base station due to the base station determining that a maximum or target load level has been exceeded; and a device for receiving a subsequent command from the base station to increase loading after a recovery period initiated after the base station has determined that a normal load condition resulted after said reduction of the data rate wherein said recovery period is different from recovery periods used by other neighboring base stations. This aspect of the present invention could for instance be embodied in a mobile telephone.

According to a sixth aspect of the present invention, a system comprises a radio network controller for providing a plurality of maximum or target load level signals and a plurality of recovery period parameter signals with different recovery periods indicated a plurality of neighboring base stations connected to said radio network controller, each responsive to a respective maximum or target load level signal and a respective recovery period parameter signal from the radio network controller; and a plurality of mobile communication devices connected to said base stations by radio interfaces wherein upon detection of a maximum or target load level exceeded on one or more of said interfaces, one or more of said base stations cause data rates on corresponding radio interfaces to be reduced whereafter upon returning to a normal load condition, said one or more base stations wait for a recovery period before increasing loading again, wherein said recovery periods are different for at least one of said one or more base stations so as to prevent oscillation of load level on said one or more radio interfaces.

According to a seventh aspect of the present invention, a method of reducing load on one or more radio interfaces linking one or more corresponding mobile devices with a plurality of corresponding neighboring base stations, the method carried out in each mobile device comprises receiving signaling from a base station commanding a reduction of a data rate on a radio interface between the mobile device and the base station due to the base station determining that a maximum or target load level has been exceeded on said radio interface, and receiving a subsequent command from the base station to increase loading after a recovery period initiated after the base station has determined that a normal load condition resulted after said reduction of the data rate wherein said recovery period is different from recovery periods used by other neighboring base stations.

According to an eighth aspect of the present invention, a method of controlling loading on radio interfaces existing between a plurality of base stations and one or more mobile devices wherein at least some of said base stations control neighboring cells, comprises providing from said radio network controller a plurality of maximum or target load level signals and a plurality of recovery period parameter signals with different recovery periods indicated to said base stations detecting in one or more of said base stations a maximum or target load level exceeded on one or more of said interfaces, and said base stations causing data rates on selected radio interfaces to be reduced whereafter upon returning to a normal load condition, one or more base stations wait for a recovery period before increasing loading again, wherein said different recovery periods prevent oscillation of load level on said one or more radio interfaces.

According to a tenth aspect of the present invention, a computer program embodied in a computer readable medium is for executing the steps according to the first aspect of the present invention in a radio network controller.

According to an eleventh aspect of the present invention, a computer program embodied in a computer readable medium is for executing the steps according to the second aspect of the present invention in a base station or Node B.

According to a twelfth aspect of the present invention, a computer program embodied in a computer readable medium is for executing the steps according to the seventh aspect of the present invention in user equipment.

According to a thirteenth aspect of the present invention, apparatus according to the third aspect of the invention is embodied in an integrated circuit for a radio network controller.

According to a fourteenth aspect of the present invention, apparatus according to the fourth aspect of the present invention is embodied in an integrated circuit for a base station.

According to a fifteenth aspect of the present invention, an integrated circuit is provided for executing the steps of the seventh aspect of the invention in a mobile device.

According to the invention, the RNC can configure a Node B scheduler dependent recovery period. The Node B scheduler has to wait for this period after recovering from the overload condition before higher data rates (transmission powers) can be scheduled again. If these periods are configured differently for neighbouring Node Bs, then the potential synchronization between the different Node B schedulers' load oscillation can be avoided.

An advantage of the invention is that it allows the RNC to have some centralized control over the decentralized schedulers that may be adversely impacting each other.

As mentioned above, although the present specification discloses the invention in the context of an improvement to HSUPA, it should be realized that the core concept is applicable to other situations in wireless interfaces and not limited to HSUPA and not limited to the uplink direction.

BEST MODE FOR CARRYING OUT THE INVENTION

In a given RNC, according to the present invention, either or both of the following functions may be performed:

The RNC will provide a different recovery period parameter for Node Bs that are neighbouring each other.

RNC should be able to reconfigure the parameters if it is experienced that one Node B is getting more overloaded compared to another, thus this parameterization can partly act as a prioritization between Node Bs.

Figure 3:
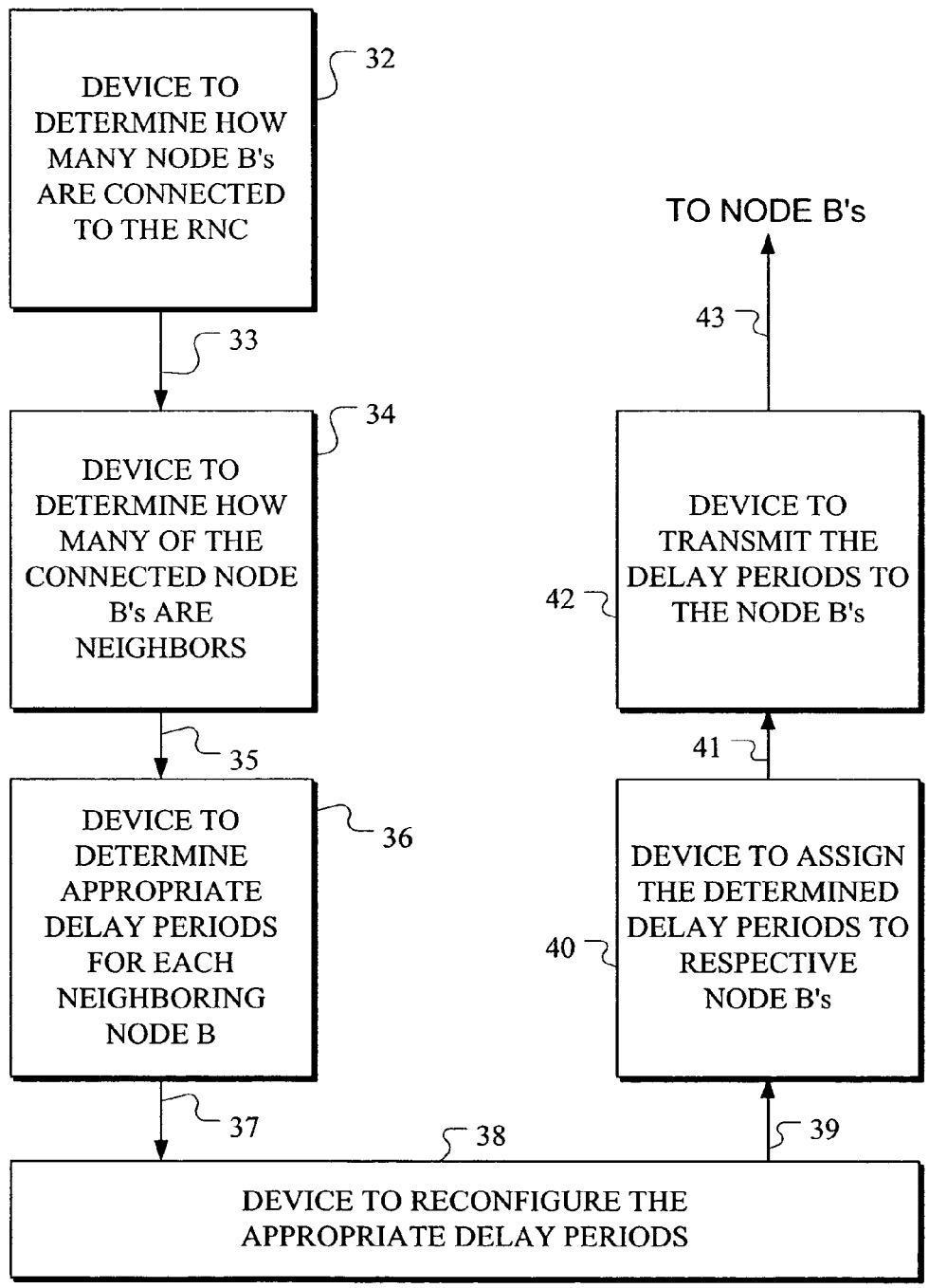
FIG. 3 illustrates an embodiment of devices in combination to carry out these functions within a given RNC.

FIG. 3 illustrates an embodiment of devices in combination to carry out these functions within a given RNC. A device 32 determines how many Node Bs are connected to the RNC. It provides a signal indication thereof on a line 33 to a device 34 which determines how many and which of the connected Node Bs are neighbors that would naturally experience radio interference due to their proximity to each other. A signal indication of this determination is provided on a line 35. A device 36 is responsive to the signal on the line 35 and determines appropriate delay periods for each neighboring Node B. It can do this by for instance consulting a lookup table that takes into consideration how much delay should be assigned, given the number of Node Bs in question or other factors. A signal is provided on a line 37 by the device 36 indicative of the particular delay that should be assigned to each respective Node B. A device 38 may be provided either downstream of the device 36 (as shown), upstream thereof, or within the device 36 which serves the purpose of reconfiguring the appropriate delay periods based on experience with delay periods determined earlier which may need reconfiguration. In any event, the appropriate delay periods for the various Node Bs may be signaled on a line 39 to a device 40 which assigns the determined delay period to respective Node Bs. The function of the device 40 may be incorporated in the device 36 or the device 38 or all three functional blocks 36, 38, 40 may be combined. A signal indication of the respective delay periods associated with the various Node Bs is signaled on a line 41 to a device 42 which transmits the respective delay periods to the associated Node Bs. This is illustrated by a signal on a line 43 shown emerging from the device 42.

Although the illustration of FIG. 3 is in the form of various devices or modules in combination, it should be realized that the devices shown connected by signals in sequence could equally as well describe a flow chart of various steps to be performed in sequence within a radio network controller. It will also be realized that the exact sequence of steps may be rearranged with some functions carried out at the same time, before or after other functions and that the invention is not limited to the precise sequence shown. It should also be realized that one or more of the illustrated devices or steps can be omitted and that other devices or steps can be added which have not been described without departing from the invention. The various devices shown in cooperation with FIG. 3 can be carried out in hardware such as an integrated circuit or software encoded for execution on a signal processor or some combination thereof. It should also be realized that the functions illustrated in FIG. 3 may be carried out in a shared fashion between multiple RNCs connected to neighboring Node Bs.

Figure 4:
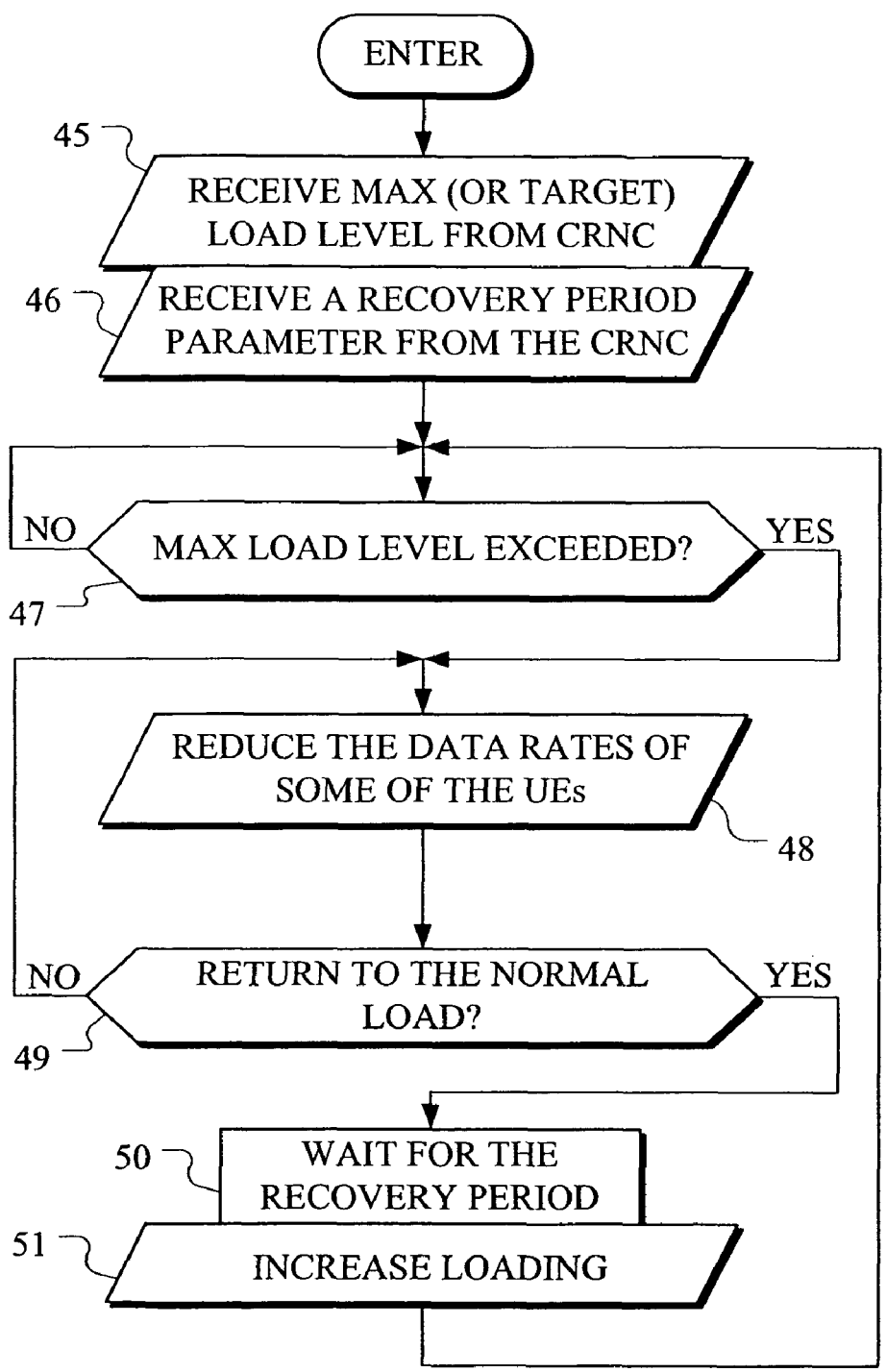
FIG. 4 shows a flow chart of steps which may be carried out in a Node B, according to the present invention.

Referring to FIG. 4, in a given Node B, some or all of the following functions may be performed:

The Node B scheduler receives in a step 45 a maximum (or target) uplink load level from the CRNC The Node B scheduler receives in a step 46 a recovery period parameter from the CRNC.

In case the maximum uplink load level is exceeded, as determined in a step 47, the Node B scheduler will reduce the data rates (transmission powers) of some of the UEs transmitting in that cell in order to recover from the high load situation as shown in a step 48. (This is a typical simplified scheduler operation)

After coming back to 'normal load' from the 'high load', as determined in a step 49, the scheduler will wait as shown in a step 50 for the RNC signalled recovery period before it can start increasing the uplink loading (i.e. the data rates of the UEs it is controlling) as shown in a step 51.

As a result of the foregoing method, during the different recovery periods, the Node Bs with longer recovery periods will be forced to wait and for a bit longer before starting to increase their loading so that the neighboring Node Bs do not all impact the environment simultaneously with similar increased loading patterns. By delaying the start of the Node Bs with various longer recovery periods the various Node Bs will not tend to oscillate their loading up and down altogether as in the prior art described above.

Although FIG. 4 has been shown in the form of a flow chart illustrating various steps that can be carried out in a given Node B according to the present invention and which would normally be carried out in software, it should be realized that the functions described by the steps could as well be carried out in hardware such as an integrated circuit or some combination of software and hardware. Therefore, the illustration of FIG. 4 should be understood as constituting an illustration of either a method or a device. In other words, the steps of FIG. 4 could as easily have been illustrated in a manner similar to the illustration of the devices of FIG. 3 in combination.

It should also be understood that the devices or steps shown in FIGS. 3 and 4 can be embodied in the form of a computer program encoded on to a computer readable medium with code written in a selected computer language. When such code is embodied in a computer readable device it may take the form of a computer software product which can be used in another device such as a mobile communications device.

Figure 5:
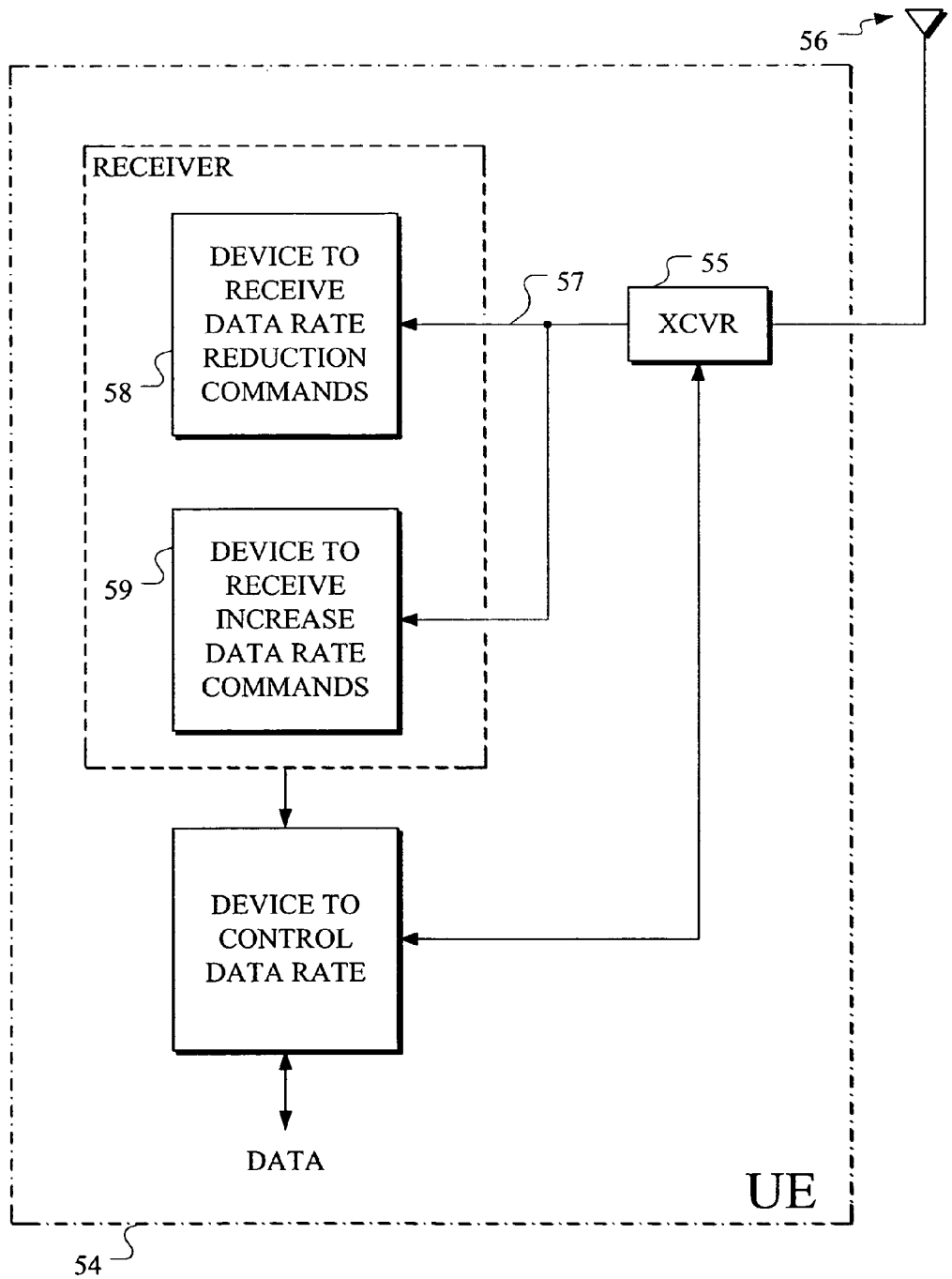
FIG. 5 shows a user equipment, according to the present invention.

FIG. 5 shows a mobile device 54, according to the invention. It includes a transceiver 55 attached to an antenna 56. The transceiver provides an incoming command signal on a line 57 to means 58 for receiving signaling from a base station commanding a reduction of a data rate on a radio interface between the mobile device 54 and the base station due to the base station determining that a maximum or target load level has been exceeded. The transceiver also provides an incoming command signal on the line 57 to means 59 for receiving a subsequent command from the base station to increase loading after a recovery period, said subsequent command initiated after the base station has determined that a normal load condition resulted after said reduction of the data rate wherein said recovery period is different from recovery periods used by other neighboring base stations.

Figure 1:
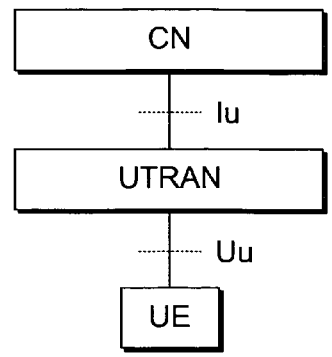
FIG. 1 shows the packet network architecture for the Universal Mobile Telecommunications System (UMTS) according to the prior art.
Figure 2:
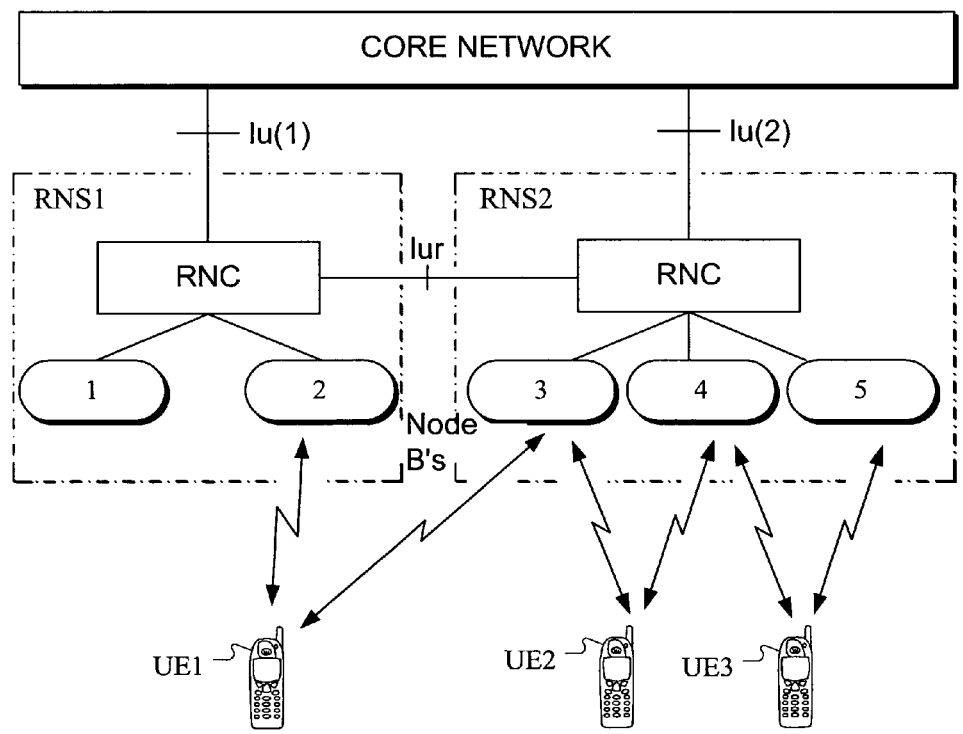
FIG. 2 shows some further details of the overall architecture of the UMTS according to the prior art.

It should be realized that when the various component parts shown in the FIGS. 3-5 are combined in a system such as shown in FIG. 2, a new system is created, according to the invention, which does not suffer from the load oscillation problem mentioned above.

Such a system comprises a radio network controller for providing a plurality of maximum or target load level signals and a plurality of recovery period parameter signals with different recovery periods indicated. It also includes a plurality of neighboring base stations (Node Bs) connected to said radio network controller, each responsive to a respective maximum or target load level signal and a respective (different) recovery period parameter signal from the radio network controller. Finally the system includes a plurality of mobile communication devices connected to said base stations by radio interfaces wherein upon detection of a maximum or target load level exceeded on one or more of said interfaces, one or more of said base stations cause data rates on corresponding radio interfaces to be reduced whereafter upon returning to a normal load condition, said one or more base stations wait for a recovery period before increasing loading again, wherein said recovery periods are different for each base station so as to prevent oscillation of load level on said one or more radio interfaces.

The invention claimed is:

1. A method comprising:
   determining different delay periods for each of a plurality of neighboring base stations, the different delay periods to be used in delaying a recovery period before increasing loading after a maximum or target load level has been exceeded in one or more radio interfaces between one or more of the neighboring base stations and one or more user equipment devices connected thereto by a respective radio interface; and
   transmitting the determined delay periods to each of the neighboring base stations,
   wherein the different delay periods are determined so as to prevent oscillation of load levels on said one or more radio interfaces.

2. A method comprising:
   receiving in a base station a maximum or target load level and a recovery period parameter from a radio network controller;
   determining if the maximum or target load level has been exceeded on a radio interface between the base station and one or more user equipment devices connected thereto by said radio interface;
   sending data rate reduction commands to selected user equipment devices, the data rate reduction commands configured to cause the selected user equipment devices to reduce their respective data rates;
   determining whether a normal load condition has been achieved as a result of a reduction in data rates of the selected user equipment devices; and
   waiting for a recovery period indicated by said recovery period parameter before increasing loading and again determining if the maximum or target load level is exceeded.

3. An apparatus comprising:
   means for determining different delay periods for each of a plurality of neighboring base stations, the different delay periods to be used in delaying a recovery period before increasing loading after a maximum or target load level has been exceeded in one or more radio interfaces between one or more of the neighboring base stations and one or more user equipment devices connected thereto by a respective radio interface; and
   means for transmitting the determined delay periods to each of the neighboring base stations wherein the different delay periods are determined so as to prevent oscillation of load levels on said one or more radio interfaces.

4. An apparatus comprising:
   means for receiving in a base station a maximum or target load level and a recovery period parameter from a radio network controller;
   means for determining if the maximum or target load level has been exceeded on a radio interface between the base station and one or more user equipment devices connected thereto by said radio interface;
   means for generating and sending data rate reduction commands to selected user equipment devices, the data rate reduction commands configured to cause the selected user equipment devices to reduce their respective data rates;
   means for determining whether a normal load condition has been achieved as a result of a reduction in data rates of the selected user equipment devices; and
   means for waiting for a recovery period indicated by said recovery period parameter before increasing loading and again determining if the maximum or target load level is exceeded.

5. A system comprising:
   a radio network controller for providing a plurality of maximum or target load level signals and a plurality of recovery period parameter signals with different recovery periods indicated; and
   a plurality of neighboring base stations connected to said radio network controller, each responsive to a respective maximum or target load level signal and a respective recovery period parameter signal from the radio network controller, each having one or more radio interfaces supporting concurrent communication with a plurality of mobile communication devices,
   wherein upon detection of a maximum or target load level exceeded on one or more of said radio interfaces, one or more of said base stations cause data rates on corresponding radio interfaces to be reduced whereafter upon returning to a normal load condition, said one or more base stations wait for a recovery period before increasing loading again, wherein said recovery periods are different for at least one of said one or more base stations so as to prevent oscillation of load level on said one or more radio interfaces.

6. A method of controlling loading on radio interfaces existing between a plurality of base stations and one or more mobile devices wherein at least some of said base stations control neighboring cells, the method comprising:
   providing from a radio network controller a plurality of maximum or target load level signals and a plurality of recovery period parameter signals with different recovery periods indicated to said base stations; and
   detecting in one or more of said base stations a maximum or target load level exceeded on one or more of said radio interfaces, and said base stations causing data rates on selected radio interfaces to be reduced whereafter upon returning to a normal load condition, one or more base stations wait for a recovery period before increasing loading again, wherein said different recovery periods prevent oscillation of load level on said one or more radio interfaces.

7. An article of manufacture including a non-transitory computer-readable medium having instructions stored thereon that, if executed by a computing device, cause the computing device to perform operations comprising:

determining different delay periods for each of a plurality of neighboring base stations; and transmitting the determined delay periods to each of the neighboring base stations for use in delaying a recovery period before increasing loading after a maximum or target load level was exceeded in a radio interface between one or more of the neighboring base stations and one or more user equipment devices connected thereto by said radio interface.

8. An article of manufacture including a non-transitory computer-readable medium having instructions stored thereon that, if executed by a computing device, cause the computing device to perform operations comprising:

receiving in a base station a maximum or target load level and a recovery period parameter from a radio network controller;

determining if the maximum or target load level has been exceeded on a radio interface between the base station and one or more user equipment devices connected thereto by said radio interface;

sending data rate reduction commands to one or more user equipment devices to reduce their respective data rates;

determining whether a normal load condition has been achieved in response to the reduction of the data rates; and waiting for a recovery period indicated by said recovery period parameter before increasing loading and again determining if the maximum or target load level is exceeded.

9. The apparatus of claim 3 embodied in an integrated circuit.

10. The apparatus of claim 4 embodied in an integrated circuit.

* * * * *

UNITED STATES PATENT AND TRADEMARK OFFICE
CERTIFICATE OF CORRECTION

| | | |
|---|---|---|
| PATENT NO. | : 7,925,271 B2 | |
| APPLICATION NO. | : 11/270047 | |
| DATED | : April 12, 2011 | |
| INVENTOR(S) | : Ranta-Aho et al. | |

It is certified that error appears in the above-identified patent and that said Letters Patent is hereby corrected as shown below:

Column 7, line 67, in Claim 3, delete "stations" and insert -- stations, --.

Signed and Sealed this
Sixteenth Day of August, 2011

David J. Kappos
*Director of the United States Patent and Trademark Office*